May 31, 1955 R. O. WALTON Re. 24,015

GAS LIFT APPARATUS

Original Filed Aug. 10, 1946

ROBERT O. WALTON
*INVENTOR.*

BY R. Werlin

ATTORNEY

United States Patent Office

Re. 24,015
Reissued May 31, 1955

24,015

GAS LIFT APPARATUS

Robert O. Walton, Bentonville, Ark., assignor to Garrett Oil Tools, Inc., Longview, Tex., a corporation of Texas Original No. 2,634,689, dated April 14, 1953, Serial No. 689,687, August 10, 1946. Application for reissue July 1, 1954, Serial No. 440,880

15 Claims. (Cl. 103—233)

Matter enclosed in heavy brackets [ ] appears in the original patent but forms no part of this reissue specification; matter printed in italics indicates the additions made by reissue.

This invention relates to gas lift apparatus employed in deep wells for production purposes and is more particularly directed to injection valves commonly employed with such apparatus.

Two general types of valves are most commonly employed in such apparatus. In one, the valve is constructed with a pre-set pressure responsive means arranged to respond directly to some predetermined pressure differential between the pressure of the injection gas and that of the fluid column to be moved thereby. In the other, although the actual transfer of gas from a lifting gas reservoir through the injection valve to the fluid column to be moved is responsive to the differential in their respective pressures, movement of the valve mechanism itself is controlled by mechanism within the valve arranged to operate upon the "pop-valve" principle, that is, one which includes a mechanism responsive to a predetermined difference in pressure between that of the injection gas and the opposing pressure of a movable element such as a spring or pressure-fluid loaded diaphragm, bellows or piston which is pre-set at a fixed pressure.

All such prior art devices are subject to a serious operating limitation in that the pre-setting means must be set before the valve is run in the well and such presetting is controlled by the particular pressure conditions which it is anticipated will be used in the well. Thus, the valve, having once been set, if the relative pressure levels of the available source of lifting gas and of the fluid column to be lifted change substantially from the original levels, the valves must be withdrawn from the well and reset for operation in accordance with the new pressure levels. Since, in many cases, the source of supply of the lifting gas is not constant or uniform, either as to pressure or volume, or the pressure in the source reservoir of the fluid to be moved is likewise subject to change, this often requires repeated withdrawal of the tubing string, to which the valves are normally attached, and manual resetting of the valves for operation at the changing pressure levels with consequent considerable expense and loss of production time. Furthermore, in the prior art devices which employ a pressure-fluid loaded moving member, the pressure fluid employed is not the injection fluid but is gas or liquid which is enclosed within a hermetically sealed chamber. Such devices in addition to the disadvantage previously mentioned, of requiring resetting for changing pressure conditions under which they are operated, also are subject to the further disadvantage that the hermetically sealed chamber may leak and thereby undesirably change the setting of the valve. Moreover, "pop-valve" type units generally require a large pressure differential across the bellows or diaphragm which tends to cause rupturing of such members.

It is a principal object of this invention, therefore, to provide a gas-lift apparatus employing injection valves which may be reset to accommodate changing pressure levels by pressure and volume adjustments at the top of the well, without requiring removal of the valves from the well.

*It is another principal object to provide an apparatus and a system for use in producing wells wherein the operating characteristics of a flow controlling valve in the well can be changed without removing the valve from the well by means manipulatable from and controlled at the earth's surface.*

Another important object of this invention is to provide an improved form of injection valve which is operable at an original pre-set differential pressure independent of the pressure level of the actuating gas, or of the fluid to be lifted thereby.

Another object of this invention is the provision of an improved form of injection valve is adapted to operate in response to a predetermined differential pressure of the actuating gas across a valve operating member, opposed surfaces of which are exposed to the pressure of the same actuating medium.

A further object of this invention is to provide an injection valve in which the operating member is subjected to the pressure of the actuating gas acting upon opposed surfaces thereof, wherein means are provided for establishing a predetermined difference in pressure of the actuating gas on the opposed surfaces.

A more specific object of this invention is the provision of an injection valve having a valve member connected to a flexible valve-moving member having opposed surfaces exposed to the same actuating gas, one of the surfaces being enclosed within a chamber, which is provided with valved passageways communicating with the source of actuating gas, whereby a differential pressure of the actuating gas may be maintained across the flexible member.

Still another object is the provision of an injection valve which is operable at different pressure levels merely by controlling the pressure at the source of the actuating gas.

A further important object is the provision of injection valves, which, when installed serially along a column of fluid to be moved thereby, may be operated at successively higher operating pressures in descending order along the column, to thereby utilize to a maximum degree the energy available in the injection gas.

Other and more specific objects and advantages of this invention will become apparent from the following detailed description when read in conjunction with the [accompanyingy] *accompanying* drawings which illustrate useful embodiments of this invention.

Figure 1:
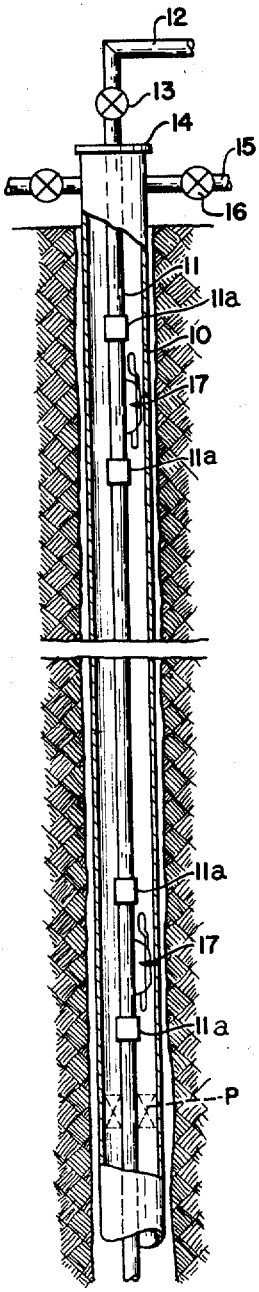
Fig. 1 is a semi-diagrammatic longitudinal section through a well installation illustrating one use of the valve structure of this invention.

Referring to the drawings, and in particular to Fig. 1, there is shown a portion of a well casing 10 of any conventional type through which there extends a tubing 11 of smaller diameter than [the] casing and through which oil or other fluids are adapted to flow from the well to the surface of the ground, whence such fluids are discharged through a pipe 12 fitted with a valve 13 to suitable separators or storage devices (not shown). The top of the casing surrounding the tubing 11 is closed by a conventional casing head 14 near the upper end of which, in communication with the annular space between the casing and tubing (hereinafter called the "annulus"), is a pipe 15 fitted with a control valve 16. Located along tubing 11 in the annulus and suitably connected to tubing 11 at suitable intervals are a plurality of flow valves, indicated generally by the numerals 17, of the type to which this invention relates. The number of such flow valves will vary with the type of well, its depth and other conditions pertaining to the particular well. Valves 17 are connected, as is generally conventional, to suitable tubing nipples which are connected into the tubing string by means of collars 11*a*. The tubing 11 may be packed-off from the casing by a conventional packing member, indicated in dotted outlines by the letter P, or the operation to be hereinafter described may be conducted without the use of such a packer, both arrangements being conventional in the art to which this invention relates.

Figure 2:
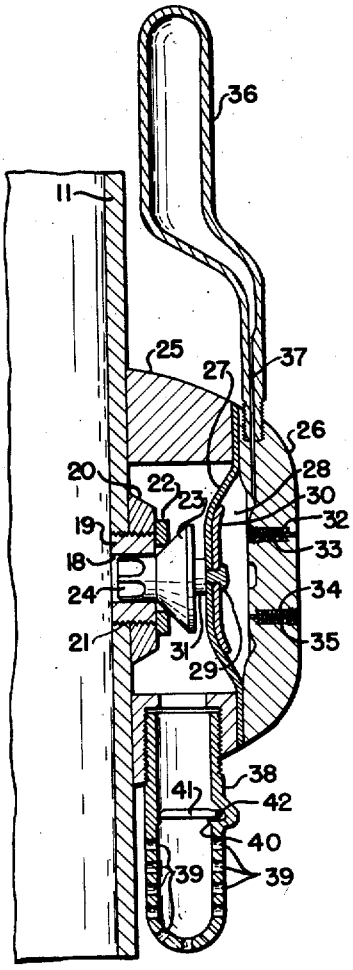
Fig. 2 is an enlarged vertical section through a valve unit constructed in accordance with one embodiment of the present invention.

Fig. 2 illustrates more particularly the detailed construction of valves 17. A passageway 18 extends through the wall of tubing 11 and is formed by a threaded tubular seat bushing 19 which is screwed through a boss 20 arranged concentrically about a suitable opening 21 in the wall of the tubing. The outer end of seat bushing 19 is provided with a circular seat 22 adapted for the seating of a conical valve member 23, having a generally cylindrical extension 24, which extends into passageway 18 and serves as a guide for the seating of valve member 23. Valve member 23 is enclosed within a dome-shaped housing comprising a generally tubular section 25, one end of which is welded or otherwise connected to the wall of tubing 11 to form a leak-proof connection therewith. The outer end of section 25 is provided with a generally dome-shaped cover 26, which is fastened to the outer end of section 25 in any suitable or conventional manner. A disk-shaped flexible diaphragm 27 has its edge peripherally tightly clamped between the end of section 25 and cover 26 of the valve housing and forms a leak-proof partition between the interior of section 25 and a chamber 28 formed by the area between the outside of diaphragm 27 and the inner wall of cover 26. The relative areas of seat 22 and diaphragm 27 will preferably be so selected that when maximum casing pressures used for the valve operation are attained, thereby creating maximum pressure differentials across seat 22, the differential across diaphragm 27, necessary to raise valve member 23 from seat 22 will not exceed the setting of inlet valve 33. The outer end of valve member 23 is firmly connected to the center of diaphragm 27 by means of a stud 29 which extends through a dished reinforcing plate 30, arranged to cover the central portion of the outer face of diaphragm 27, and into a boss 31 on the outer end of valve member 23. The opposite face of the wall of cover 26 is suitably contoured to complement the contours of reinforcing plate 30. This face of cover 26 acts as a stop to limit the extent of the outward movement of diaphragm 27. The size and form of diaphragm 27 are so chosen with relationship to the depth of chamber 28 and the length of travel of valve member 23 to avoid undue stretching of the diaphragm in response to the difference in pressures on the opposite sides thereof, to thereby prevent rupturing thereof during operation.

Cover 26 has a passageway 32 therethrough providing communication between the exterior of the valve housing and chamber 28 and has mounted therein a spring-controlled pressure relief valve 33 constructed and arranged to permit passage of fluids in one direction only, namely from the exterior of the valve housing into chamber 28.

A second passageway 34 through cover 26 is similarly fitted with a spring controlled pressure relief valve 35, which is arranged therein to permit flow of fluid only outwardly from chamber 28 to the exterior of the valve housing. For purposes of this description, valve 33 will be designated as the inlet valve and valve 35 as the exhaust valve for chamber 28. Valve 33 will normally be set to maintain some suitable pressure differential between the exterior of the valve housing and chamber 28. For example, valve 33 may conveniently be set to maintain a pressure differential of fifty pounds per square inch gauge between chamber 28 and the exterior of the housing. Exhaust valve 35 will normally be set to maintain a lower differential pressure, generally of the order of about ten pounds per square inch gauge. Connected to cover 26 is a pressure expansion reservoir 36, which communicates with the interior of chamber 28 through a passageway 37. Extending through the wall of section 25 of the valve housing, and communicating with the interior thereof, is a generally cylindrical inlet tube 38, the outer end of which is closed and provided with a plurality of ports 39. The combined area of all the ports 39 is made greater than the area of passageway 18. At an intermediate point in inlet tube 38, between ports 39 and the interior of section 25, there is located an annular shoulder 40 which forms a seat for a flapper type check valve 41, which is hingedly attached at 42 to the side of inlet tube 38. With this arrangement, check valve 41 is operable to admit fluid moving from ports 39 to the interior of section 25 while preventing movement of fluid in the opposite direction.

The valve mechanism described above is employed in the following manner in flowing well fluid from the well through tubing 11:

At the beginning of operations, tubing 11, fitted with a requisite number of valves 17, will have been run into the well through casing 10 and, a static level of well fluid will normally be present at some point in the casing and tubing above the level of the producing horizon and below the top of the casing. The uppermost valve 17 may be positioned in the tubing string so that it will be just above the static level of the well fluid, although it may be placed so as to be submerged initially. The inlet and exhaust valves 33 and 35, respectively, will have been set at the desired differential pressures, for examples at fifty pounds in the case of inlet valve 33 and ten pounds in the case of exhaust valve 35. A supply of actuating gas at relatively high pressure will then be admitted through pipe 15 under the control of valve 16 into the annulus, at greater volumes than can be passed by flow valve 17 until the desired operating pressure has been reached within the annulus. Assuming the uppermost valve 17 to be above the static level of the well fluid in the casing and tubing, the actuating gas will enter ports 39 in inlet tubing 38 lifting check valve 41 and passing into the interior of section 25 of the valve. At the same time the actuating gas, since it surrounds valve 17, will also flow through passageway 32 into chamber 28, since the pressure of the actuating gas will normally be substantially in excess of fifty pounds per square inch, the setting of inlet valve 33. As a result, both faces of diaphragm 27 will be exposed to the pressure of the same actuating gas, but since a differential pressure of fifty pounds exists across the diaphragm, the pressure within chamber 28 will be fifty pounds lower than the pressure within the interior of section 25 of valve housing and in the surrounding annulus. This pressure differential will force diaphragm 27 to move inwardly of chamber 28 toward cover 26, moving valve member 23 in the corresponding direction and opening passageway 18 to admit actuating gas into the interior of tubing 11. The gas thus admitted will, of course, flow upwardly through the tubing to the top of the well. This operation will continue until the desired operating pressure is reached and the gas supply at the surface is closed off. This will allow the pressure within the annulus to be dissipated through passageway 18 into tubing 11 to a point below that which was reached due to the excessive volumes of actuating fluid which were being admitted, until the pressure within chamber 28 is slightly greater than the pressure in the annulus which will cause valve member 23 to seat on seat 22. When actuating fluid is again introduced into the annulus through valve 16 the pressure within the annulus increases and as the actuating fluid is injected into the annulus normally at a moderate rate, the pressure increase is relatively slow, and this will gradually raise the pressure within the annulus to a point above that present within chamber 28 (during the opening and closing of the valves, there is no migration of fluid through valves 33 and 35 unless it is desired to change the annulus operating pressure). As there is a greater differential across the seats 22 of the upper valves than there is across the seats 22 of the lower valves, the lower valves will open first, due to a smaller differential across diaphragm 27 being necessary to raise valve member 23 from seat 22 of these valves. This will allow the well liquid to flow from the annulus into tubing 11 and rise therein above passageway 18 of the uppermost valve before this valve will open. When the pressure within the annulus has increased sufficiently above the pressure in chamber 28 of the uppermost valve to raise its valve member 23 from seat 22, then gas will be admitted through passageway 18 into tubing 11 and the fluid above passageway 18 will be lifted to the surface. This lifting will be accomplished, either by aeration of the fluid column or by forming slugs of gas in the fluid column which act as gas pistons to drive the segment of liquid above passageway 18 toward the top of the well from which it will flow through valve 13 and pipe 12 to suitable separators of storage vessels (not shown), depending upon whether the gas admitted through pipe 15 and valve 16 is admitted by means of conventional intermitting devices or in a continuous manner by means of a suitable choke arrangement also conventionally used in gas lift operations.

The other valves 17 further down in the string will also be opened by the combination of the gas pressure exerted against the top of the column of fluid in the annulus and the weight of the column of fluid standing above each of these valves. However, in the case of the valves which are thus initially submerged in liquid, since the pressure of the liquid surrounding the valves will exceed the fifty-pound setting of inlet valve 33 whenever the head of liquid exceeds this pressure as the valves are submerged, liquid from the annulus will flow into chamber 28 and when the pressure of the surrounding fluid exceeds the fifty pound differential maintained by valve 33, the diaphragms 27 of these submerged valves will also, as in the case of the uppermost valve, be urged toward cover 26 and open their respective passageways to the tubing. The fluid trapped in the chambers 28 of the several submerged valves will be compressed by the movement of the diaphragms and will be forced through the respective passageways 37 into the pressure expansion reservoirs 36. The latter will normally contain air originally present at atmospheric pressure and this will be compressed by the liquid entering reservoirs 36. When the diaphragms 27 are flexed in the opposite direction in closing the valves, the liquid in reservoirs 36 will flow back into the respective chambers 28 and the trapped air in reservoirs 36 will expand correspondingly. The initial trapping of liquid in chambers 28 will thus in no way hamper the successful functioning of the valves, and the movement of the valves will remain responsive to the differential pressure of the actuating gas operating on opposite faces of diaphragms 27.

The operation may be begun, if desired, by initially closing valve 13 on the tubing while the actuating fluid is being injected through valve 16 into the annulus. This will prevent a wastage of lifting fluid from escaping through valve 13 to the surface while necessary pressure is being attained in the annulus. After the desired pressure is reached valve 16 will be closed and valve 13 opened. This will allow the pressure on the tubing to be dissipated to the surface receivers, and valve 17 will pass actuating fluid into the tubing until the pressure in the annulus has dropped slightly below the pressure in chamber 28, which will allow valve member 23 to be moved to its seat 22 by the higher pressure on diaphragm 27.

If the intermitting system of introduction of successive volumes of gas is employed, valve 16 will, of course, be closed as soon as the desired pressure is attained in the annulus as described above. The application of the pressure of the actuating gas through valve 16 will open valve [successive volumes of gas is employed,] *member 23 as previously described.* [valve] *Valve* 16 will be left open only long enough to pass enough gas into the annulus to open valve member 23 and to lift the desired column of well fluid to the surface. The pressure increase on the annulus will not be great enough to cause additional pressure fluid to pass into chamber 28. When valve 16 is closed the pressure in the annulus will be dissipated into the tubing until the pressure in this area is slightly lower than the pressure in chamber 28. Then valve member 23 will be closed by the action of diaphragm 27—the valves being so constructed as to the ratio of areas of diaphragm 27 and seat 22, that only a very small pressure differential across diaphragm 27 is required to close valve 23. This being the case, no pressure will bleed out of chamber 28 in normal operation. This process of opening valve 16 to admit gas to the annulus at a moderate rate to cause the lower valves to open and pass the well liquid from the annulus into the tubing 11 and to then cause the uppermost valve to open and pass lifting gas under the column of fluid in the tubing, followed by closing valve 16 and allowing pressure to be dissipated to attainment of the valve closing point, is repeated until enough well fluid has been removed from the annulus so that the second valve is exposed to the lifting gas. At this point there will be a smaller differential across seat 22 of the second valve than there is across the seat 22 of the uppermost valve, so less pressure increase will be required to open valve member 23 of the second valve than to open the uppermost valve. The second valve will start operating exactly as the uppermost valve did and will continue operation until the next lower valve is reached at which time the third valve will start to function with gas injection, this operation being repeated for each successively lower valve until the bottom valve has been reached by the lifting gas, at which time it will continue to operate independently of the other valves due to the fact that it will have a heavier column of well liquid in the tubing above its passageway 18 and will thereby have a smaller differential across its seat 22 and will, therefore, be opened by a lesser pressure increase than the upper valves.

At this point, if an intermitter has been employed to supply actuating gas in the manner described to unload the tubing, the control of valve 16 may be switched to a continuous operation by employing a conventional choke control which will continuously feed in sufficient gas to the annulus to maintain the lowermost valve in an open position, at the desired operating pressure, so as to continually feed into the tubing sufficient gas to continually aerate the fluid column in the tubing and keep it flowing to the top of the well. Of course, the intermittent operation may continue to be employed, if desired, and the type of final flowing operation will depend largely on the conditions obtaining at the particular well.

With a valve of the form above described, it will be seen that opening and closing of the valve will be primarily dependent upon the pressure differential maintained across diaphragm 27 by means of inlet valve 33, irrespective of the average pressure of the actuating gas. Thus, if it is desired to operate the valves at some higher average operating pressure than that initially employed, it is only necessary, by suitable manipulation of the surface controls, to increase the pressure and volume of the employed actuating gas to attain the desired pressure in the annulus, whereupon the average operating pressure of the valve will be correspondingly increased, since inlet valve 33 will continue to function to maintain the initially determined pressure differential across diaphragm 27.

Similarly, when it is desired that the valves should function at an average operating pressure below that originally employed, the pressure in the annulus is allowed to drop to the desired level by suitable manipulation of the surface controls and exhaust valve 35 will exhaust fluid from chamber 28, always maintaining its pre-set differential pressure in the chamber, until the desired pressure level is reached. Thereafter, when actuating gas is admitted to the annulus, the pressure outside and inside chamber 28 will build up correspondingly and the preset differential pressure controlled by inlet valve 33 will be re-established and the valves will function exactly as previously described, but at the lower pressure level.

From the foregoing, it will be evident that the opening and closing of the valves is strictly a function of increasing and decreasing pressure within the annulus and such opening and closing may be effected at any average operating pressure desired. Furthermore, since the valves are all normally constructed to the same specifications, the greater the differential pressure across the several seats 22, the greater will be difference between the opening and closing pressures of the valves in the series. Thus at any given operating pressure, each valve in descending order will open preferentially relative to the valves above it, because with a column of fluid standing in tubing 11, the differential pressures across seats 22 will be successively lower for each valve in descending order in the series. However, if desired, the pressure differential across the diaphragms 27 may be set differently for each valve unit, by suitably varying the settings of inlet valves 33 and exhaust valves 35, so that the lowest pressure differential is set for the uppermost valve in the string in such manner that as the pressure increases in the annulus, the total pressure load created by the pressure differential across seat 22 will be greater than the pressure load created by the pressure differential across diaphragm 27. This means that once the pressure surrounding the valve unit increases beyond the predetermined setting, valve member 23 cannot be raised from seat 22 unless there is a low pressure differential across seat 22, this pressure differential across the seat being dependent upon the load of liquid in the tubing above the valve level. Since the pressure differential across the seat of a lower valve is less than that above a higher valve under a given head in the tubing, then, by increasing the pressure in the annulus as each valve is uncovered, the successive valves could be operated at successively higher pressures, the upper valves being kept closed as the increasing operating pressure produces pressure differentials across the seats of the higher valves which are in excess of the pre-set pressure differentials of these valves.

Figure 3:
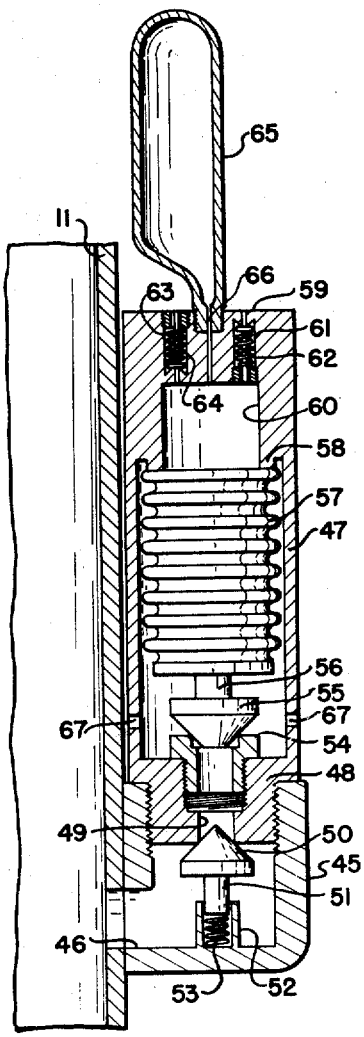
Fig. 3 is a view similar to Fig. 2 through a valve constructed in accordance with another embodiment of the present invention.

Fig. 3, which illustrates another embodiment in accordance with this invention employs a somewhat modified form of valve moving member in place of diaphragm 27 of the embodiment illustrated in Fig. 2. As illustrated in Fig. 3, the valve includes a hollow L-shaped chamber 45 mounted on the side of tubing 11 so that one end of the chamber opens upwardly parallel to the tubing. The other end of the chamber is connected to the side of the tubing in liquid-tight engagement therewith and the wall of the tubing is provided with a passageway 46 furnishing communication between the interior of chamber 45 and the interior of the tubing. A generally tubular housing 47, the lower end of which is provided with a threaded extension 48, is screwed into the upwardly opening end of chamber 45. Extension 48 is provided with an axial passageway 49 which provides communication between the interior of housing 47 and chamber 45. The lower end of passageway 49 is closed by means of a valve member 50 having a stem 51 fitted in a sleeve 52 mounted on the bottom of chamber 45. A coil spring 53 is mounted within sleeve 52 and acts against the end of stem 51 to normally urge valve member 50 in a direction to close the lower end of passageway 49. A tubular seat bushing 54 is screwed into the upper end of extension 48 from within housing 47 and has its bore aligned with passageway 49. A valve member 55 provided with an upwardly extending stem 56 is arranged to move axially of housing 47 in opening and closing the passageway through seat 54. The upper end of valve stem 56 is firmly attached to the lower end of a hollow bellows 57, of generally conventional construction, enclosed within housing 47 and having its upper periphery connected in liquid-tight engagement to an annular shoulder 58 arranged in the upper portion of housing 47. The upper end of housing 47 extends for a short distance above the upper end of bellows 58 and is closed by an end plate 59 forming a chamber 60 within the bore of the housing which is in communication with the interior of bellows 58. By the arrangement described bellows 58 forms a [fleixble] *flexible* liquid-tight partition in housing 47 separating chamber 60 from the balance of the interior of the housing. Cover 59 is provided with a passageway 61, which provides communication between the exterior of the housing and chamber 60. Passageway 59 is fitted with a spring loaded pressure relief valve 62 and which corresponds in construction and function to inlet valve 32 of Fig. 2. Passageway 63 is also provided in cover 59 likewise furnishing communication between the exterior of housing 47 and chamber 60 and is fitted with a spring loaded pressure relief valve 64, which corresponds in construction and function to exhaust valve 35 of Fig. 2. A pressure expansion reservoir 65 is mounted on cover 59 and communicates with chamber 60 through a passageway 66 extending through cover 59. A series of inlet ports 67 are provided in the wall of housing 47 intermediate between extension 48 and shoulder 58 and provides communication between the exterior of the housing and the portion of the interior thereof below shoulder 58. The total area of all of the ports 67 is made greater than the area of the passageway through seat 54.

The embodiment illustrated in Fig. 3 operates in substantially the same manner as that shown in Fig. 2 and described above. Inlet valve 62 and exhaust valve 64 are set at predetermined pressures, such as was previously described for valves 33 and 35, to maintain a predetermined differential pressure in chamber 60. The inner and outer surfaces of bellows 57 are therefore subject to the difference in pressure of the same actuating gas just as in the previously described modification, bellows 57 being compressed to lift valve member 55 from seat 54 to open the valve when the pressure of the actuating gas externally of the bellows exceeds the pressure inside the bellows as controlled by the valves in cover 59. Similarly, when the pressure exterior of the bellows is less than the pressure within chamber 60 the bellows will be extended and valve member 55 moved into the valve closing position. Valve member 50 operates in a manner corresponding to check valve 41 of the embodiment of Fig. 2 in that it likewise acts as a check valve when the pressure load in tubing 11 exceeds the pressure load at the opposite end of passageway 49. In all other respects the embodiment illustrated in Fig. 3 functions in exactly the same manner as was previously described in connection with the embodiment illustrated in Fig. 2.

It will be understood that although the above described embodiments are illustrated and described as arranged for the injection of the actuating gas from the annulus into the tubing, the valve units may, if desired, be positioned within the tubing and operated to direct the flow of actuating gas from the tubing into the casing for the purpose of lifting fluid from the annulus rather than from the tubing. This alternative arrangement is entirely conventional in gas lift apparatus of the class to which this invention is applicable.

The pressures at which inlet and exhaust valves 33 and 35 in Fig. 2 and 62 and 64 in Fig. 3 may be set may, of course, be varied from the figures given above merely by way of example. Since, however, the form of valve in accordance with this invention successfully lends itself to the use of relatively low differential pressures, of the order of magnitude mentioned above, across the diaphragm or bellows, as the case may be, the danger of rupturing these flexible members is greatly reduced and the operating life of the valves is thus substantially increased.

It will be understood that various changes and alterations may be made in the embodiments described above without departing from the spirit of this invention but within the scope of the appended claims.

The invention having been described what is claimed is:

1. A gas injection valve comprising, a valve member adapted to control a gas injection passageway, an operating member for moving said valve relative to said passageway, a housing enclosing said operating member having means for exposing opposed surfaces of said operating member to the pressure of the same actuating gas, and differential pressure operated valve means connected to said housing on one side of said operating member and pre-set to maintain the pressure of said actuating gas on one side of said operating member within a predetermined range above and below the pressure of said gas on the opposite side of said operating member.

2. A gas injection valve comprising, a valve member adapted to control a gas injection passageway, a housing enclosing said valve member, a flexible member mounted in said housing to form a fluid-tight partition therein, said valve member being connected to said flexible member and movable thereby relative to said passageway, ports in said housing for admitting actuating gas therein on opposite sides of said flexible member, and differential pressure operated valve means connected to the ports on one side of said flexible member and pre-set to maintain the pressure of said gas thereon within a predetermined range above and below the pressure on the opposite side of said flexible member.

3. A gas injection valve comprising, a valve member adapted to control a gas injection passageway, a housing enclosing said valve member, a flexible member mounted in said housing to form a fluid-tight partition therein, said valve member being connected to said flexible member and movable thereby relative to said passageway, ports in said housing for admitting actuating gas therein on opposite sides of said partition, and pressure regulating means cooperating with the ports on one side of said partition to maintain thereon a pressure of said actuating gas within a predetermined range above and below the pressure on the opposite side of said partition, said pressure regulating means including a pair of pressure relief valves set at different pressures, the one set at the higher pressure being arranged to direct flow of gas inwardly of said housing and the other to exhaust gas from said housing.

4. A gas injection valve comprising, a valve member adapted to control a gas injection passageway, a housing enclosing said valve member, a flexible member mounted in said housing to form a fluid-tight partition therein, said valve member being connected to said flexible member and movable thereby relative to said passageway, ports in said housing for admitting actuating gas therein on opposite sides of said partition, pressure regulating means cooperating with the ports on one side of said partition to maintain thereon a pressure of said actuating gas within a predetermined range above and below the pressure on the opposite side of said partition, and an expansion chamber communicating with said housing on the side of said partition controlled by said pressure regulating means.

5. A gas injection valve comprising, a valve member adapted to control a gas injection passageway, a housing enclosing said valve member, a flexible member mounted in said housing to form a fluid-tight partition therein, said valve member being connected to said flexible member and movable thereby relative to said passageway, ports in said housing for admitting actuating gas therein on opposite sides of said partition, check valve means connected to the ports on one side of said partition to direct flow of fluid inwardly only of said housing, and differential pressure operated valve means connected to the ports on the opposite side of said partition and pre-set to maintain thereon a pressure of said actuating gas within a predetermined range above and below the pressure on said one side of said partition.

6. A gas lift system for wells, comprising, in combination with a casing having a tubing therein provided with a plurality of gas passageways establishing communication at vertically spaced points between the casing and tubing and means at the top of the well for supplying lifting gas to said passageways under controlled conditions of volume and pressure, valve members controlling each of said passageways, operating members connected to each of said valve members, each of said operating members having opposed surfaces exposed to the pressure of said lifting gas, a housing enclosing each of said operating members, and differential pressure operated valve means connected to each of said housings and pre-set to maintain the pressure of said gas in said housings on one side of each of said operating members within a predetermined range above and below the pressure of said gas on the opposite side of each of said operating members, said range being the same for each of said valve members.

7. A gas lift system for wells, comprising, in combination with a casing having a tubing therein provided with a plurality of gas passageways establishing communication at vertically spaced points between the casing and tubing and means at the top of the well for supplying lifting gas to said passageways under controlled conditions of volume and pressure, valve members controlling each of said passageways, operating members connected to each of said valve members having opposed surfaces exposed to the pressure of said lifting gas, a housing enclosing each of said operating members, and differential pressure operated valve means connected to each of said housings and pre-set to maintain the pressure of said gas in said housings on one side of each of said operating members within a predetermined range above and below the pressure of said gas on the opposite side of each of said operating members, said range being of increasing magnitude for said valve members in descending order along said tubing.

8. A gas lift system for wells comprising in combination with a casing having a tubing therein provided with a plurality of gas passageways establishing communication at vertically spaced points between the casing and tubing and means at the top of the well for supplying lifting gas to said passageway under controlled conditions of volume and pressure, valve members controlling each of said passageways, operating members connected to each of said valve members having opposed surfaces exposed to the pressure of said lifting gas, a housing enclosing each of said operating members, and differential pressure operated valve means connected to each of said housings and pre-set to maintain the pressure of said gas in said housings on one side of each of said operating members within a pre-determined range above and below the pressure of said gas on the opposite side of each of said operating members.

[9. A well flowing device of the character described comprising, a housing having a passage therein, a valve in said passage, a chamber including pressure responsive means movable to actuate said valve under the influence of ambient pressures exteriorly of the housing, and a loaded inlet valve to said chamber for admission of a charging pressure to the chamber from the ambient pressure exteriorly of the housing, said inlet valve being loaded to charge said chamber at a pressure less than the maximum value of the ambient pressure by a predetermined amount.]

[10. A well flowing device of the class described comprising, a valve housing having a passage therein, a valve in said passage, distensible means operatively connected to said valve to move the valve to and from closed position, a volume chamber communicating with said means, and means responsive to ambient pressure for maintaining within a predetermined range the differential in pressure between the interior and the exterior of the chamber, said last mentioned means including inwardly and outwardly opening check valves operable to admit and exhaust pressure fluid to and from the volume chamber when differential pressures develop in excess of predetermined maxima.]

*11. A well flowing device adapted to be mounted on a well conduit for operation at a substantial depth in a well to control flow of fluid into and out of such conduit and while the device is thus positioned in the well to have its operating characteristics changed through an instrumentality controlled at the surface of the earth without removing the device from the well comprising, in combination, a housing; pressure responsive means in the housing and defining therewith a fluid-tight closed pressure charge chamber adapted to contain an expansible pressure fluid; said pressure responsive means having opposed surfaces, one exposed to the interior of said chamber and the other to actuating fluid exteriorly ambient of said device; a valve member operatively connected to said pressure responsive means to be moved thereby to control fluid flow through a passageway and between a point exterior and a point interior of said conduit; and means for regulating the pressure of said expansible fluid within said chamber while the device is disposed at a substantial depth in a well including port means extending to be in fluid communication with the interior of said chamber and the exterior thereof at a point under the pressure of said actuating fluid, valve means controlling flow through said port means to selectively permit the pressure of said actuating fluid to be exerted on said expansible fluid in said chamber so that where the pressure of said actuating fluid exceeds that of said expansible fluid in said chamber, the pressure in said chamber is increased by a predetermined amount and where the pressure of said actuating fluid is less than that in said chamber, the pressure in said chamber is decreased by a predetermined amount, and means for moving said valve means to closed position where it remains despite substantial variation in pressure of said actuating fluid above and below the pressure in said chamber.*

*12. A well flowing device adapted to be mounted on a well conduit for operation at a substantial depth in a well to control flow of fluid into and out of such conduit and while the device is positioned in the well to have its operating characteristics changed through an instrumentality controlled at the surface of the earth without removing the device from the well comprising, in combination, a housing; pressure responsive means in the housing and defining therewith a fluid-tight closed pressure charge chamber adapted to contain an expansible fluid under pressure; said pressure responsive means having opposed surfaces, one exposed to the interior of said chamber and the other to actuating fluid exteriorly ambient of said device; a valve member operatively connected to said pressure responsive means to be moved thereby to control fluid flow through a passageway in the well; and means operable from a point remote from said device to regulate the pressure of said expansible fluid within said chamber while the device is within a well in accordance with the pressure of said actuating fluid by selectively interrupting and establishing pressure communication between said actuating fluid and said expansible fluid in said chamber so that where the actuating fluid pressure exceeds that of said expansible fluid by a predetermined amount and said pressure communication is established, the pressure of the expansible fluid is increased and where the actuating fluid pressure is less than that of said expansible fluid by a predetermined amount and said pressure communication is established, the expansible fluid pressure is decreased, said regulating means when interrupting said pressure communication being operable to prevent establishment of said pressure communication despite substantial variation of the actuating fluid pressure from the expansible fluid pressure.*

*13. A system for producing a well comprising, in combination, a conduit in the well through which the well is to be produced, said conduit providing a passageway situated at a pre-selected depth in the well remote from the earth's surface and providing fluid communication between a point on the interior and a point at the exterior of said conduit; a housing carried by said conduit in the well; pressure responsive means in the housing and defining therewith a fluid-tight closed pressure chamber adapted to contain an expansible pressure fluid; said pressure responsive means having opposed surfaces, one exposed to the interior of said chamber and the other to fluid exterior of said conduit and within the well bore; a valve member operatively connected to said pressure responsive means to be moved thereby to control fluid flow through said passageway; and means for regulating the pressure of said expansible fluid within said chamber while the device is disposed at said pre-selected depth in the well including port means providing pressure communication between the interior of the chamber and said fluid exterior of said conduit, normally closed valve means controlling flow through said port means and operable to permit flow into and out said chamber, and means manipulatable at the surface of the earth to control said valve means so as to permit the pressure of said fluid exterior of said conduit to be exerted on said expansible fluid in said chamber so that where the pressure of said exterior fluid exceeds that of said expansible fluid, the pressure in said chamber is increased by a predetermined amount and where the pressure of the exterior fluid is less than that in said chamber, the pressure in said chamber is decreased by a predetermined amount.*

*14. A system for producing a well comprising, in combination, a conduit in the well through which the well is to be produced, said conduit providing a passageway situated at a pre-selected depth in the well remote from the earth's surface and disposed to conduct fluid flowing between a point interior of said conduit and a point exterior of said conduit; pressure responsive valve means in the well and controlling flow through said passageway responsive to pressure of fluid exterior of the conduit including a closed pressure charge chamber adapted to contain an expansible fluid under pressure, pressure responsive means having opposed surfaces, one exposed to the pressure of fluid in said chamber and the other to the pressure of said fluid exterior of said conduit, a valve member operatively connected to said pressure responsive means to be moved thereby to control flow through said passageway; means selectively operable to impress the pressure of said exterior fluid upon said expansible fluid in said chamber so as to regulate the pressure of said expansible fluid in said chamber to reflect the pressure of said fluid exteriorly of said conduit and then to isolate said pressure of said exterior fluid from said expansible fluid so that said exterior fluid pressure can vary from that of said expansible fluid without changing the pressure of the latter; and means operatively controllable at the surface of the earth to cause said selectively operable means to so impress and to so isolate said exterior fluid pressure.*

*15. In a well flowing apparatus wherein a pressure responsive valve means is mounted at a substantial depth in a well on a conduit disposed in the well and wherein said valve means includes a pressure responsive means controlling the opening and closing of a valve in said valve means to control flow into and out of said conduit, and wherein means are provided for applying the pressure of*

*fluid exterior of said conduit to said pressure responsive means in opposition to the pressure of resilient fluid in a closed fluid-tight chamber, the combination therewith of actuatable means in the well adapted to be controlled from the earth's surface, said actuatable means being operable to apply the pressure of said fluid exterior of said conduit on said resilient fluid in said chamber to raise and lower the pressure of said resilient fluid by a predetermined amount where the pressure of said exterior fluid is respectively higher and lower than that in said chamber and also operable to prevent the application of pressure of said exterior fluid to that in said chamber despite substantial variation in the pressure of said exterior fluid from that in said chamber, and means manipulatable at the surface of the earth for controlling said actuatable means to cause it to apply and prevent the application of said pressure of said exterior fluid to that in said chamber whereby the operating characteristics of said valve means can be changed without removing the same from the well.*

*16. A well flowing device comprising, a housing having a passage therein, a valve in said passage, a chamber including pressure responsive means movable to actuate said valve under the influence of ambient pressures exteriorly of the housing, and a loaded inlet valve to said chamber exposed with the device disposed in a well to the ambient pressure exteriorly of the housing for admission of a charging pressure to the chamber from said ambient pressure, said inlet valve being loaded to charge said chamber at a pressure less than the maximum value of the ambient pressure by a predetermined amount.*

*17. A well flowing device of the class described comprising, a valve housing having a passage therein, a valve in said passage, distensible means operatively connected to said valve to move the valve to and from closed position, a volume chamber communicating with said means, and means responsive to ambient pressure for maintaining within a predetermined range a differential in pressure between the interior and the exterior of the chamber, said last mentioned means including inwardly and outwardly opening check valves operable to admit and exhaust pressure fluid to and from the volume chamber when differential pressures develop in excess of predetermined maxima.*

References Cited in the file of this patent or the original patent

UNITED STATES PATENTS

| | | |
|---|---|---|
| 1,952,581 | Boynton | Mar. 27, 1934 |
| 2,079,135 | Turner | May 4, 1937 |
| 2,163,255 | Binder | June 20, 1939 |
| 2,212,709 | Grove | Aug. 27, 1940 |
| 2,250,464 | Boynton | July 29, 1941 |
| 2,371,031 | Parker | Jan. 27, 1942 |
| 2,339,487 | King | Jan. 18, 194[illegible] |
| 2,342,301 | Peters | Feb. 22, 194[illegible] |
| 2,375,411 | Grant | May 8, 194[illegible] |
| 2,377,981 | Taylor | June 12, 194[illegible] |
| 2,385,316 | Walton | Sept. 18, 194[illegible] |
| 2,465,060 | Carlisle | Mar. 22, 194[illegible] |